(12) United States Patent
Jiang et al.

(10) Patent No.: US 8,164,522 B2
(45) Date of Patent: Apr. 24, 2012

(54) LOCALIZATION METHOD AND SYSTEM THEREOF

(75) Inventors: Joe-Air Jiang, Taipei (TW); Ta-Te Lin, Taipei (TW); En-Cheng Yang, Taipei (TW); Chwan-Lu Tseng, Taipei (TW); Fu-Ming Lu, Taipei (TW); Kuo-Chi Liao, Taipei (TW); Jyh-Cherng Shieh, Taipei (TW); Ying-Tung Hsiao, Taipei (TW); Ping-Lin Fan, Taipei (TW); Cheng-Long Chuang, Taipei County (TW); Tzu-Shiang Lin, Taichung (TW); Chia-Pang Chen, Changhua County (TW)

(73) Assignee: National Taiwan University, Taipei (TW)

( * ) Notice: Subject to any disclaimer, the term of this patent is extended or adjusted under 35 U.S.C. 154(b) by 162 days.

(21) Appl. No.: 12/721,514

(22) Filed: Mar. 10, 2010

(65) Prior Publication Data
US 2011/0102265 A1    May 5, 2011

(30) Foreign Application Priority Data
Oct. 29, 2009    (TW) .............................. 98136766 A

(51) Int. Cl.
*G01S 3/02* (2006.01)
(52) U.S. Cl. ...................................................... 342/450
(58) Field of Classification Search .................. 342/450
See application file for complete search history.

(56) References Cited

U.S. PATENT DOCUMENTS
2008/0080429 A1*  4/2008  Hart .............................. 370/332
2008/0285530 A1*  11/2008  Dietrich et al. ............... 370/338

* cited by examiner

*Primary Examiner* — Harry Liu

(57) ABSTRACT

A positioning method for a sensor node is provided, and the method includes steps of: providing a first antenna having a first omnidirectional radiation pattern on a first plane; rotating the first antenna about an axis substantially parallel to the first plane; transmitting a wireless signal while the first antenna rotates about the axis for every a predetermined central angle; receiving the wireless signal at the sensor node; obtaining Received Signal Strength Indications (RSSIs) of the respective wireless signals; and determining a location of the sensor node according to the RSSIs.

19 Claims, 5 Drawing Sheets

LOCALIZATION METHOD AND SYSTEM THEREOF

FIELD OF THE INVENTION

The present invention relates to a localization system in wireless sensor networks. More particularly, the present invention relates to a collaborative localization system with rotatable omnidirectional antennas in wireless sensor networks.

BACKGROUND OF THE INVENTION

The wireless sensor networks (WSNs) consists of a number of miniature low-power sensor nodes. The sensor nodes are chiefly equipped with several micro-sensors, a microprocessor, and a radio chip providing wireless communication capability. The functionalities of sensor nodes form WSNs due to their wide and valuable applicability in various fields. Applications of WSNs also stimulated great interests in developing wireless ad-hoc sensor networks. Unlike existing hardwired networks, the logical topology of a sensor network is not necessarily associated with its physical topology. Usually, a sensor network is data-centric system that measures the sensing events according to the attributes of the events. The data sensed by sensor networks are meaningless if we do not know the locations where the sensing events are occurred. Thus, to provide a reliable localization scheme is a fundamental but essential issue for the applications of WSNs when the location information of sensor nodes is required.

There are two easy ways to determine the location of each sensor node. The location information may be obtained while the network was deployed manually. The other approach is to equip each sensor node with a self-positioning device, e.g., global positioning system (GPS). However, these methods are unrealistic to deploy a large-scale sensor network. Recently, many localization algorithms for WSNs have been proposed. These algorithms can be categorized either as range-free or range-aware algorithms based on whether they use the range (i.e., distance) information.

The range-aware approaches measure the distance between two sensor nodes based on physical measurements. Existing localization methods make use of three types of physical measurements: time of arrival (TOA), time difference of arrival (TDOA), angle of arrival (AOA), and received signal strength (RSS) or energy. These methods are mainly based on the measurements of acoustic ultrasounds or electromagnetic signals transmitted between sensor nodes. These approaches are found to have their own advantages and disadvantages. Ultrasounds-based TOA and TDOA estimations are not suitable for many practical applications due to signal-reverberating effects. A number of environmental factors may shorten the range of ultrasound propagation, e.g. scattering, absorption, and reflection when ultrasound wave encounters a small particle compared to its wavelength. These drawbacks make the ultrasound-based approaches unreliable. Radio-based TOA and TDOA estimations require high synchronization accuracy up to nanosecond for correct operation. In addition, measurement of AOA requires a set of carefully calibrated directional antennas, which significantly increases the cost and system complexity.

Due to the drawback of range-aware approaches, a number of range-free localization methods have been proposed, such as centroid, area-based point-in-triangulation, ad-hoc positioning system, convex position estimation, distributed localization estimation, Monte Carlo localization, and mobile and static sensor network localization. The error rates of range-free algorithms are high if the communication range of sensor nodes is not circular. In addition, the range-free algorithms require several sensor nodes working together to accomplish a localization task, so that they suffer from power consuming. Among the approaches mentioned above, the radio propagation model is known as a simple function under a priori assumption. Such an assumption is an over-simplification for many scenarios.

To address these challenges, a localization framework for WSNs without adding expensive hardware (e.g., GPS, time synchronizer, sensitive timer) to the sensor nodes is proposed. The basic principle of the proposed framework is to make use of the phenomenon of radio irregularity in WSNs. In addition, a robust correlation is incorporated in analyzing the relative positions between two sensor nodes using received signal strength indication (RSSI) pattern. A cooperative localization scheme is also developed to reinforce the accuracy of the estimation while multiple fixed sensor nodes are available.

It is therefore attempted by the applicant to deal with the above situation encountered in the prior art.

SUMMARY OF THE INVENTION

Accordingly, a collaborative localization (positioning) method and system are conceived by the Applicant to estimate the unknown coordinate of the sensor nodes in the WSN. External antenna arrangements are presented to approximate the distance-power gradient model. A modified robust regression is also incorporated to determine the relative azimuth and distance between a sensor node and a fixed reference node. In addition, a cooperative localization scheme that incorporates estimations from multiple fixed reference nodes is presented to reinforce the accuracy of the localization. The proposed method is tested via computer-based analysis and field-testing. Experimental results demonstrate that the proposed method is a useful solution for localizing sensor nodes in unknown or changing environments.

In accordance with the first aspect of the present invention, a positioning method for a sensor node is provided. The method includes steps of: providing a first antenna having a first omnidirectional radiation pattern on a first plane; rotating the first antenna about an axis substantially parallel to the first plane; transmitting a wireless signal while the first antenna rotates about the axis for every a predetermined central angle; receiving the wireless signal at the sensor node; obtaining Received Signal Strength Indications (RSSIs) of the respective wireless signals; and determining a location of the sensor node according to the RSSIs.

Preferably, the RSSIs have a predetermined number, and the step of determining the location of the sensor node further includes steps of: constructing a first RSSI pattern by the predetermined number of the RSSIs; and determining the location of the sensor node by the first RSSI pattern.

Preferably, the first antenna is configured on a first reference node, and the method further includes steps of: providing a second reference node; and obtaining a second RSSI pattern to commonly determine the location of the sensor node with the first RSSI pattern.

Preferably, the step of determining the location of the sensor node further comprises a step of using the RSSI pattern as a feature value to determine the location via a pattern recognition method.

Preferably, the predetermined number is a value of an integer part of a quotient of $2\pi$ divided by a degree of the predetermined central angle.

Preferably, the sensor node has a second antenna having a second omnidirectional radiation pattern on a second plane perpendicular to the axis.

Preferably, the first and the second antennas are dipole omni-directional antennas, and the first plane is perpendicular to a horizontal plane.

Preferably, the wireless signal is a beacon and is a linear polarization electromagnetic wave.

In accordance with the second aspect of the present invention, a positioning system is provided. The system includes: a sensor node having a radiation pattern on a first plane; and a first dipole omnidirectional antenna oriented parallel to the first plane.

Preferably, the system further includes a servomotor and a reference node, wherein the servomotor is configured on the first dipole omnidirectional antenna and rotating the first dipole omnidirectional antenna about an axis perpendicular to the first plane and the first dipole omnidirectional antenna is configured on the reference node.

Preferably, the first dipole omnidirectional antenna is configured to transmit a wireless signal while the first antenna rotates about the axis for every a predetermined central angle, the sensor node is configured to receive the wireless signal and combines respective Received Signal Strength Indications (RSSIs) of the received wireless signals to obtain an RSSI pattern, and a location of the sensor node is determined by the RSSI pattern.

Preferably, the system further includes a second reference node to obtain a second RSSI pattern to commonly determine the location of the sensor node with the first RSSI pattern.

Preferably, the sensor node has a second dipole omnidirectional antenna having the radiation pattern.

In accordance with the third aspect of the present invention, a method for localizing a sensor node is provided. The method includes steps of: providing a directive radiation pattern on a first plane; rotating the directive radiation pattern; transmitting a wireless signal every time when the directive radiation pattern is rotated for a predetermined central angle; and determining a location of the sensor node according to respective Received Signal Strength (RSSIs) of the wireless signals received by the sensor node.

Preferably, the RSSIs have a predetermined number, and the step of determining the location of the sensor node further includes steps of: constructing a first RSSI pattern by the predetermined number; and determining the location of the sensor node by the first RSSI pattern.

Preferably, the method further includes a step of providing a second reference node to obtain a second RSSI pattern.

Preferably, the step of determining the location of the sensor node further comprises a step of using the first RSSI pattern as a feature value to determine the location by a pattern recognition method.

Preferably, the predetermined number is a value of an integer part of a quotient of $2\pi$ divided by a degree of the predetermined central angle.

Preferably, the step of rotating the directive radiation pattern further includes a step of providing a first antenna having the directive radiation pattern on the first plane to determine the location of the sensor node.

Preferably, the step of determining the location of the sensor node further includes a step of providing a second antenna having the omnidirectional radiation pattern on the first plane for receiving the signal.

BRIEF DESCRIPTION OF THE DRAWINGS

The foregoing and other features and advantages of the present invention will be more clearly understood through the following descriptions with reference to the drawings, wherein:

FIG. 8 (B) illustrates an overall solution space, $\Im(x, y)$, merged by the robust correlations estimated from reference nodes $r_1$, $r_2$ and $r_3$.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
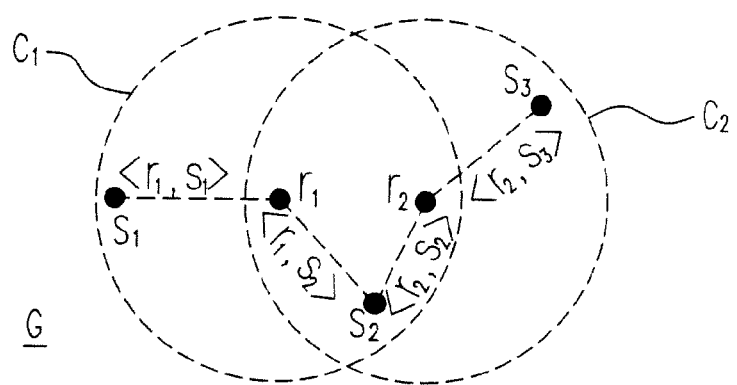
FIG. 1 illustrates a configuration diagram of the wireless sensor networks.

The follows is a first embodiment of the application. A WSN is composed of at least one sensor node and one reference node, wherein the coordinates of the reference nodes are assumed to be known a priori. The location of the sensor node is estimated based on the measurements of nearby reference nodes. We represent the WSN configuration by the Euclidean graph G=(V, E), wherein G represents for the network, V represents for vertex and E represents for edges, as depicted in FIG. 1, with the following properties:

V={S, R} is a set of nodes in the network, wherein a set of sensor nodes S and a set of reference nodes R are included. The set of sensor nodes S includes sensor nodes $s_1$-$s_{num\_S}$, wherein num_S is the number of sensor nodes. In FIG. 1, for example, num_S=3. Each sensor node is equipped with an RSSI, or RSS, sensor. The set of reference nodes R includes reference nodes $r_1$-$r_{num\_R}$, wherein num_R is the number of reference nodes. In FIG. 1, for example, num_S=2. Each sensor node is equipped with a servomotor-controlled external antenna, which is not shown in FIG. 1. Dash-line circles, $C_1$ and $C_2$, represent for the communication ranges of reference nodes, $r_1$ and $r_2$, respectively.

The set of sensor nodes S of the network do not know their location information.

Physical positions of the set of reference nodes R are obtained by manual placement or external means. These nodes are the basis of the localization (positioning) system.

$<r_i, s_j> \in E$, wherein i=1, ..., num_R, and j=1, ..., num_S. The distance between $r_i$ and $s_j$ is lesser than the communication range of $r_i$.

Given all physical positions $(x_r, y_r)$, for all reference nodes $r_i \in R$, the locations $(x_s, y_s)$ of as many $s_j \in S$ could be estimated by the localization system.

In the embodiment, each node in the set of nodes V in the network G is equipped with an omnidirectional dipole antenna as its external antenna. The omnidirectional antenna radiates power uniformly in the horizontal plane with a directive pattern shape in the vertical plane. Please referring to FIG. 2, these external antennas (namely the omnidirectional antenna) are installed on each sensor node $s_i$ for i=1, 2, ..., num_S and reference node $r_j$ for j=1, 2, ..., num_R, in FIG. 1, in different configuration that makes them readily used in different operations.

Figure 2:
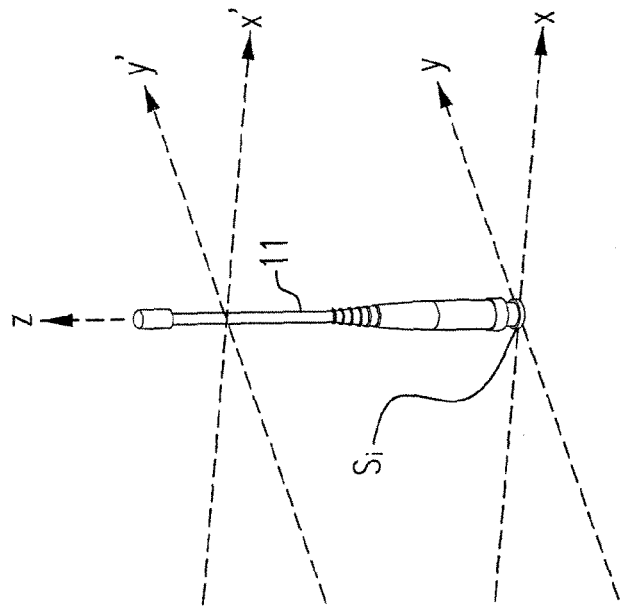
FIG. 2 illustrates a configuration diagram of the omnidirectional antenna 11 and the omnidirectional antenna 22.
Figure 2:
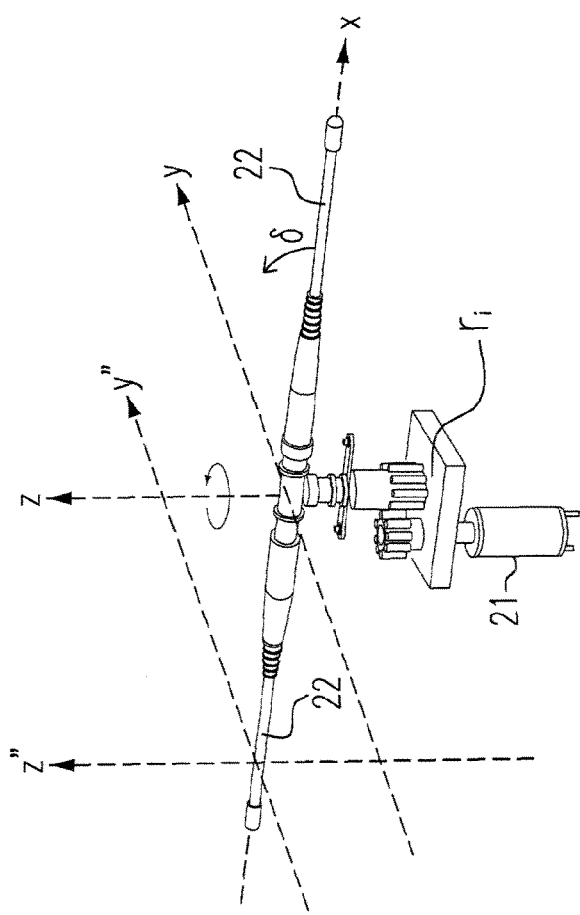

1) Please referring to the exemplary diagram of a sensor node $s_i$ in FIG. 2, an external antenna, namely the omnidirectional antenna 11, is coupled through an impedance matching circuit to the sensor node $s_i$. The antenna is z-axis (upward) oriented in the vertical position to attain the best reception in any direction on the horizontal xy-plane.

2) Please referring to the exemplary diagram of a sensor node $r_i$ in FIG. 2, a low-power servomotor 21 driven by a simple drive controller (not shown) is installed on the reference node $r_i$. The schematic of the reference node $r_i$ with external antenna, namely the omnidirectional antenna 22, is depicted in FIG. 2 also. The servomotor 21 is upward oriented, which is perpendicular to the horizontal plane. Thus, the omnidirectional antenna 22 is rotated about the z-axis in the horizontal plane, wherein the rotating direction thereof is counterclockwise in the embodiment, and the angular speed is $v_c$ degree per step. With this configuration, the radiation pattern of the reference node $r_i$ becomes directive on horizontal xy-plane. This configuration is similar to a radar system, except that the radar uses electromagnetic waves to identify the distance and direction of the target, but the reference node in the localization system of the present invention uses RSSI patterns.

Suppose the sensor node $s_i$ is located at an unknown location $(x_s, y_s)$, and the reference node $r_i$ with external antenna r is located at a known location $(x_r, y_r)$. A radio signal is transmitted by the reference node $r_i$, and the unknown location of $s_i(x_s, y_s)$, is estimated by RSSI measurements of the radio signal. The distance between the reference node $r_i$ and the sensor node $s_i$ can be estimated by solving the following equations $$d_{<r,s>} = \sqrt{(x_r-x_s)^2 + (y_r-y_s)^2} \quad \text{Equation (1)}$$

where $d_{<r,s>}$ is the measured distance between the reference node $r_i$ and the sensor node $s_i$.

The reference node $r_i$ having the omnidirectional antenna 22 as shown in FIG. 2 broadcasts a signal, e.g. a beacon, while the omnidirectional antenna 22 rotates about the z-axis by $n \times v_c$ degrees (central angle), wherein n is gear ratio. The sensor node $s_i$ in FIG. 2 measures the RSSI of the beacon from the reference node $r_i$, and transmits the measured RSSI back to the reference node $r_i$ immediately. The reference node $r_i$ repeats above procedures on condition that the sensor node $s_i$ is still in the communication range of the reference node $r_i$.

From the Friis equation, the signal power of the beacon received by the sensor node $s_i$ can be formulated by $$P_s(d_{<r,s>}, \theta_s, \varphi_s, \vec{a}_s, \Gamma_s, \theta_r, \varphi_r, \vec{a}_r, \Gamma_r) = \quad \text{Equation (2)}$$
$$P_r G_s(\theta_s, \varphi_s) G_r(\theta_r, \varphi_r) \left(\frac{\lambda}{(4\pi)d_{<r,s>}}\right)^2 (1-|\Gamma_r|^2)(1-|\Gamma_s|^2)$$
$$|\vec{a}_r \cdot \vec{a}_s^*|^2 e^{-\alpha d_{<r,s>}}$$

wherein $P_r$ is the signal power of the beacon transmitted by the reference node $r_i$, $P_s$ is the signal power of the beacon received by the sensor node $s_i$, $\lambda$ is the signal wavelength, and $\alpha$ is the distance-power gradient of the mediums in the path of signal propagation. $G_r$ and $G_s$ are functions of angular directions that represent gains of the antenna of the reference node $r_i$ and the sensor node $s_i$ in the direction $(\theta_r, \phi_r)$ and $(\theta_s, \phi_s)$, respectively. $\Gamma_r$ and $\Gamma_s$ are the reflection coefficients of the antennas of the reference node $r_i$ and the sensor node $s_i$, namely the omnidirectional antenna 22 and 11, respectively. $\vec{a}_r$ and $\vec{a}_s$ are polarization vectors of the antennas of the reference node $r_i$ and the sensor node $s_i$. It shows clearly that $P_s$ is deeply influenced not only by $d_{<r,s>}$, but also the antenna orientations of the reference node $r_i$ and the sensor node $s_i$.

From the configuration of the antennas in FIG. 2, the spatial orientations of the omnidirectional antenna 22 and 11 are in orthogonal arrangement at all times regardless the azimuths of the omnidirectional antenna 22 of the reference node $r_i$ about the z-axis. The $\vec{a}_r \cdot \vec{a}_s^*$ in the equation is zero due to the polarization vector $\{\vec{a}_r, \vec{a}_s\}$ of the antennas of the reference node $r_i$ and the sensor node $s_i$ are mismatch. Theoretically, it deflates the value of $P_s$ to zero; therefore, no beacon can be received by the sensor node $s_i$.

However, the polarization state of the electromagnetic (EM) wave that carries the beacon can be altered by particles and/or interfaces existing in the natural environment. According to the Brewster's law, when the EM wave is reflected from a non-metallic or dielectric interface, it will be s-polarized with an electrical field parallel to the interface. Thus, the polarization vector of the reflected EM wave may be changed. Through reflections, the polarizing angle of the EM wave can be altered to all possible angles, which follows Law of Malus.

For example, the omnidirectional antenna 22 broadcasts a beacon. The polarization vector of a first EM wave, which carries the beacon, is $\vec{a}_r$. The first EM wave may be altered to a second EM wave, and the polarization vector thereof is altered from $\vec{a}_r$ to $\vec{a}_r'$, after being reflected from a plane that has the normal vector $\vec{n}_1$. Again, the second EM wave is altered to a third EM wave after being reflected from a plane that has the normal vector $\vec{n}_2$, and the polarization vector $\vec{a}_r'$ is altered to $\vec{a}_r''$. The third EM wave is scattered to all directions if it encounters a small molecules of the air, known as Rayleigh scattering. Thus, the third EM wave that has altered polarization vector $\vec{a}_r''$ can propagate to all possible directions. Thereby, the beacon transmitted by the reference node $r_i$ can be received by the antenna of the sensor node $s_i$ regardless of whether the polarization vectors $\{\vec{a}_r, \vec{a}_s\}$ are matched or not.

For further illustration, any existing interface in the natural environment could be given by the equation $$P_k: a_k x + b_k y + c_k z = d \quad \text{equation (3)}$$

wherein $k=1, \ldots, N_p$, which can be represented as the number of planes for manipulating the polarization vector of an EM wave. For an EM wave that encounters an interface with the normal vector $\vec{n}_k$, its reflection vector $\vec{v}_{ref}$ could be calculated by $$\vec{v}_{ref} = \vec{v}_{inc} - 2(\vec{v}_{inc} \cdot \vec{n}_k)\vec{n}_k \quad \text{equation (4)}$$

wherein $\vec{v}_{inc}$ is the unit incidence vector, and the unit normal vector $\vec{n}_k$ could be formulated by $$\vec{n}_k = \frac{(a_k, b_k, c_k)}{\sqrt{a_k^2 + b_k^2 + c_k^2}} \quad \text{equation (5)}$$

The reflected EM wave is then re-polarized into a new state of polarization $$\vec{a}_r' = \vec{v}_{ref} \times \vec{n}_i \quad \text{equation (6)}$$

According to Law of Malus, the amplitude of the reflected EM wave is $$E_{ref} = E_{inc} \times \cos \theta_{\vec{a}_r, \vec{a}_r'} \quad \text{equation (7)}$$

wherein $E_{ref}$ and $E_{inc}$ are the amplitude of the reflected EM wave and the incidence EM wave, respectively. $\theta_{\vec{a}_r, \vec{a}_r'}$ is the angle between $\vec{a}_r$ and $\vec{a}_r'$, thereby $\cos\theta_{\vec{a}_r, \vec{a}_r'}$ can be obtained as $$\cos\theta_{\vec{a}_r, \vec{a}_r'} = \frac{\vec{a}_r \cdot \vec{a}_r'}{\|\vec{a}_r\| \|\vec{a}_r'\|} \qquad \text{equation (8)}$$

The orientations of incident surfaces existing in the natural environment could be assumed randomly oriented, and the term $|\vec{a}_r \cdot \vec{a}_s^*|^2$ could be reformulated as $$|\vec{a}_r \cdot \vec{a}_s^*|^2 \triangleq \left| \sum_n \vec{a}_r^{(n)} \cdot \vec{a}_s^* / n \right|^2 \qquad \text{equation (9)}$$

wherein n is the times that the EM wave is reflected, and $\vec{a}_r^{(n)}$ and $\vec{a}_s$ are the polarization vectors of the multi-reflected EM wave and the omnidirectional antenna 11, respectively. If there are strong multipath effects, the vector $\vec{a}_r$ could be reoriented to $\vec{a}_r^{(n)}$ that is partially detectable by the omnidirectional antenna 11. Thus, in the natural environment, the omnidirectional antenna 22 of the sensor node is still able to receive the beacon transmitted from the omnidirectional antenna 11 regardless whether the polarization vectors of the omnidirectional antenna 11 and 22 are orthogonal or not. The term $|\vec{a}_r \cdot \vec{a}_s^*|^2$ could be reduced to a constant $c_a$.

Regarding the reflection coefficients $\Gamma_r$ and $\Gamma_s$, since $\Gamma_r$ and $\Gamma_s$ are angle invariant scalars, the term $(1-|\Gamma_r|^2) \cdot (1-|\Gamma_s|^2)$ in Eq. (2) is reduced to a constant $c_\Gamma$. In addition, the mediums in the path of signal propagation are mainly air. The attenuation coefficient $\alpha$ of clear air could be seen as $0.0003 \, m^{-1}$. Thus, attenuation coefficient $\alpha$ could be set to zero, and the term $e^{-\alpha d_{<r,s>}}$ can be completely reduced to a constant $c_\alpha \cong 1$.

The signal wavelength $\lambda$ is a fixed value. Under the condition that all antennas are almost positioned at the same height, and the orientation of the omnidirectional antenna 11 is upward oriented, $G_s(\theta_s, \phi_s)$ becomes a fixed value; thus, the effects of $\theta_s$ and $\phi_s$ can be further omitted. $\phi_r$ could be omitted since the gain of the omnidirectional antenna 22 only depends on $d_{<r,s>}$ and $\theta_r$. With the aforementioned principles, the Friis equation in Eq. (2) can be approximated as $$P_s(d_{<r,s>}, \theta_r) = P_r G_s G_r(\theta_r) \left( \frac{\lambda}{(4\pi) d_{<r,s>}} \right)^2 c_\Gamma c_a c_\alpha \qquad \text{equation (10)}$$

Therefore, the variables of $P_s$ could be altered to $d_{<r,s>}$ and $\theta_r$.

Eq. (10) could be transformed into log-space, and the signal power of the RSSI could be present in dB $$\log P_s(d_{<r,s>}, \theta_r) = \log P_r + \log G_r(\theta_r) - 2 \log d_{<r,s>} + \log c \qquad \text{equation (11)}$$

wherein $c = G_s \cdot c_\Gamma \cdot c_a \cdot c_\alpha \cdot (\lambda/(4\pi))^2$, which represents shadow fading effects produced by the multipath environment. By comparing $\log P_s(d_{<r,s>}, \theta_r)$ with classic path loss model of narrowband radio propagation, the utilized antenna configurations of the present invention could reflect the changes in $\theta_r$. For a given WSN, $\log P_s(d_{<r,s>}, \theta_r)$ can be calculated or measured, and $\log P_r$ and $\log G_s(\theta_r)$ can be determined realtime at the reference node $r_i$. If the transmitted power $P_r$ is fixed, $d_{<r,s>}$ and $\theta_r$ could be used to determine the position and azimuth of the sensor node $s_i$ relative to the reference node $r_i$.

While the omnidirectional antenna 22 rotates about the z-axis, the RSSI measured by the sensor node $s_i$ changes along with $\theta_r$. As aforementioned, the reference node $r_i$ broadcasts a beacon while the omnidirectional antenna 22 rotates by $n \times v_c$ degrees, wherein n represents the gear ratio. A complete RSSI pattern is formed by transmitting the beacon for $2\pi/(n \times v_c)$ times over $\delta$, wherein $\delta$ is the azimuth of the sensor node $s_i$ relative to the reference node $r_i$. The RSSI pattern could be presented by $$\Omega_{<r,s>}(\delta) = \Lambda_r(\delta) + \in, \delta \in \{nv_c, 2nv_c, \ldots, 2\pi\} \qquad \text{equation (12)}$$

wherein $\Omega_{<r,s>}(\delta)$ is the RSSI pattern, $\Lambda_r(\delta) = \log G_r(\delta)$, and $\in = \log P_r - 2 \log d_{<r,s>} + \log c$.

Thus, the problem of localization estimation is now thereby formulated into a nonlinear equation with unknown parameters $d_{<r,s>}$ and $\delta$. In the follows, a robust solution for this problem is presented.

Figure 3:
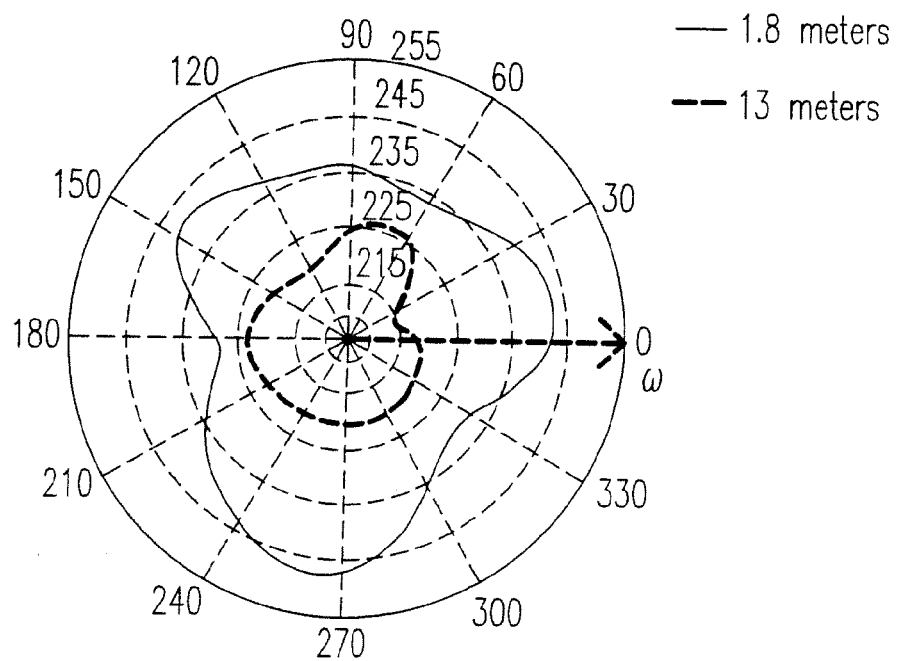
FIG. 3 illustrates a practical sample of $\Psi_r(d, \omega)$.

Assume that the RSSI patterns of the sensor node $s_i$ and the reference node $r_i$ at all possible distances are known a priori. These patterns are served as reference standard RSSI patterns $\Psi_r(d, \omega)$, wherein $\omega$ is the azimuths of the omnidirectional antenna of the reference node $r_i$. Please referring to FIG. 3, a sample pattern $\Psi_r(d, \omega)$ measured by real-world experiments under the condition that the sensor node $s_i$ is approximately located at the northern side relative to the reference node $r_i$. We can see that these patterns are asymmetric due to the effect of radio irregularity, which is different from the ideal situation. However, we can benefit from the asymmetric pattern in $\Psi_r(d, \omega)$, because it provides us more information at different angle $\omega$. For instance, if $\Psi_r(d, \omega)$ is symmetric, we can determine the distance between the reference node $r_i$ and the sensor node $s_i$, but the orientation angle of the sensor node $s_i$ relative to the reference node $r_i$ is still uncertain. This problem is eliminated by asymmetric patterns. By matching $\Omega_{<r,s>}(\delta)$ against $\Psi_r(d, \omega)$, the distance and orientation direction of the sensor node $s_i$ relative to the reference node $r_i$ can be estimated.

Figure 4:
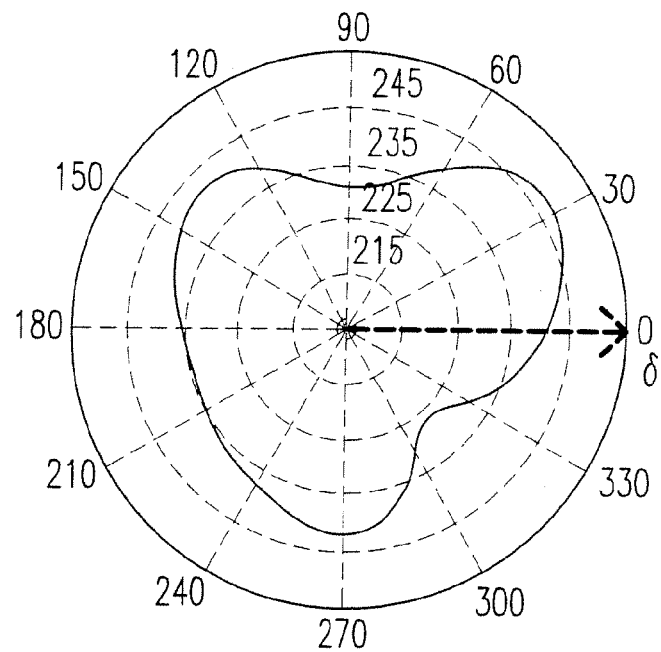
FIG. 4 illustrates an RSSI pattern, $\Omega_{<r,s>}(\delta)$.

Now the real distance and azimuth of the sensor node $s_i$ relative to the reference node $r_i$ in FIG. 2 is to be obtained, and a RSSI pattern $\Omega_{r,s>}(\delta)$ is measured as in FIG. 4. For a known $\Psi_r(d, \omega)$, we need to estimate two variables, $\hat{d}$ and $\hat{\omega}$, that minimize the difference between $\Psi_r(\hat{d}, \omega)$ and $\Omega_{<r,s>}(\delta - \hat{\omega})$, wherein $\hat{d}$ can be interpreted as the potential distance between the reference node $r_i$ and the sensor node $s_i$, and $\hat{\omega}$ can be interpreted as potential orientation angle of the sensor node $s_i$ relative to the reference node $r_i$, counterclockwise. And then localizing the sensor node $s_i$.

For estimating $\hat{d}$ and $\hat{\omega}$ that minimize the difference between $\Psi_r(\hat{d}, \omega)$ and $\Omega_{<r,s>}(\delta - \hat{\omega})$, one method is to match $\Psi_r(d, \omega)$ against $\Omega_{<r,s>}(\delta)$ so as to find out $\hat{d}$ and $\hat{\omega}$ that make a high relationship between $\Psi_r(d, \omega)$ and $\Omega_{<r,s>}(\delta)$. Currently, many metrics (e.g., Euclidian distance, Pearson correlation) have been proposed for pattern matching. These metrics are proven effective in linear problems, but they do not work well in nonlinear cases, neither in handling data with outliers. While the distance between the sensor node $s_i$ and the reference node $r_i$ is fixed, $\Psi_r(d, \omega)$ and $\Omega_{<r,s>}(\delta)$ are nonlinear functions of azimuths $\omega$ and $\delta$ with noises at an uncertain level (e.g., height of the sensor node $s_i$). Thus, matching RSSI patterns is a highly nonlinear problem that linear metrics are inapplicable to this case. In the present invention, we develop a metric, named robust correlation estimator, to indicate the strength of a relationship between two nonlinear functions, $\Psi_r(d, \omega)$ and $\Omega_{<r,s>}(\delta)$, so as to find out $\hat{d}$ and $\hat{\omega}$.

First, we need to recognize that the RSSI patterns $\Psi_r(d, \omega)$ and $\Omega_{<r,s>}(\delta)$ are functions of angular direction $\omega$ and $\delta$. It means that they are measured depending on the rotation angle of the omnidirectional antenna 22 of the reference node $r_i$. Thus, while we are comparing two RSSI patterns, it is necessary to consider the information merged in $\omega$ and $\delta$. Under this concept, we take first-order derivative of $\Psi_r(d, \omega)$ and $\Omega_{<r,s>}(\delta)$ with respect to $\omega$ and $\delta$, respectively, which can be derived as $$\Psi'_r(d, \omega) = \frac{\partial \Psi_r(d, \omega)}{\partial \omega} = \Psi_r(d, \omega+1) - \Psi_r(d, \omega) \quad \text{equation (13)}$$

$$\Omega'_{<r,s>}(\delta) = \frac{\partial \Omega_{<r,s>}(\delta)}{\partial \delta} = \Omega_{<r,s>}(\delta+1) - \Omega_{<r,s>}(\delta) \quad \text{equation (14)}$$

wherein $\Psi'_r(d, \omega)$ and $\Omega'_{<r,s>}(\delta)$ represents the first-order derivative of $\Psi_r(d, \omega)$ and $\Omega_{<r,s>}(\delta)$, respectively. The primary purpose of this process is that we can see the nonlinearity of the RSSI patterns better than that using original ones. In addition, features of RSSIs measured at adjoining azimuths can be observed during the matching process.

Then, a linear regression model is used for fitting $\Psi_r'(d, \kappa)$ and $\Omega'_{<r,s>}(\kappa)$ by $$\Psi'_r(\hat{d},\kappa)=\beta_0+\beta_1(\hat{d},\hat{\omega})\Omega'_{<r,s>}(\kappa+\hat{\omega})+\in(\beta_0,\beta_1,\kappa) \quad \text{equation (15)}$$

where $\hat{d}$ is the potential distance between the reference node $r_i$ and the sensor node $s_i$, $\kappa$ is a dummy variable ranged from 0 to $2\pi$, $\hat{\omega}$ is the azimuth of the sensor node $s_i$ relative to the reference $r_i$, $\in(\beta_0, \beta_1, \kappa)$ is the disturbance teen, and $\beta_0$ and $\beta_1$ are the intercept and slope of the regression line, respectively. Since the first-order derivative step neutralizes the baseline shift effect, the intercept $\beta_0$ can be removed from Eq. (15). The disturbance term $\in(\beta_1, \kappa)$ is formulated by Cauchy-Lorentz distribution to reduce the influences of outliers, which is given by $$\varepsilon(\hat{d}, \hat{\omega}, \beta_1, \kappa) = \frac{1}{1 + (\Psi'_r(\hat{d}, \kappa) - \beta_1(\hat{d}, \hat{\omega})\Omega'_{<r,s>}(\kappa+\hat{\omega}))^2} \quad \text{equation (16)}$$

The goal of the robust correlation estimator is to estimate $\beta_1$ by maximizing the sum of $\in(\beta_1, \kappa)$ for $\kappa=0, \ldots, 2\pi$, which can be formulated as $$\hat{\beta}_1(\hat{d}, \hat{\omega}) = \arg\max_{\beta_1} \sum_{\kappa=0}^{2\pi} (\varepsilon(\hat{d}, \hat{\omega}, \beta_1, \kappa))^2 \quad \text{equation (17)}$$

To transform $\hat{\beta}_1(\hat{d},\hat{\omega})$ into an interval ranging from 1 to $-1$, the robust correlation $\tau(\hat{d},\hat{\omega})$ can be obtained by $$\tau(\hat{d}, \hat{\omega}) = \begin{cases} \dfrac{\hat{\beta}_1(\hat{d}, \hat{\omega})}{\mu(\Psi_r(\hat{d}, \kappa), \Omega_{<r,s>}(\kappa))} & \text{if } |\hat{\beta}_1(\hat{d}, \hat{\omega})| \leq 1 \\ \dfrac{1/\hat{\beta}_1(\hat{d}, \hat{\omega})}{\mu(\Psi_r(\hat{d}, \kappa), \Omega_{<r,s>}(\kappa))} & \text{otherwise} \end{cases} \quad \text{equation (18)}$$

wherein $$\mu(\Psi_r(\hat{d}, \kappa), \Omega_{<r,s>}(\kappa)) = \max\left(\frac{\mu_{\Psi_r(\hat{d},\kappa)}}{\mu_{\Omega_{<r,s>}(\kappa)}}, \frac{\mu_{\Omega_{<r,s>}(\kappa)}}{\mu_{\Psi_r(\hat{d},\kappa)}}\right) \quad \text{equation (19)}$$

The amplitude of $\tau(\hat{d},\hat{\omega})$ measures the strength of similarity between $\Psi_r(\hat{d},\kappa)$ and $\Omega_{<r,s>}(\kappa+\hat{\omega})$. For instance, $\tau(\hat{d},\hat{\omega})=1$ represents that the reference node $r_i$ and the sensor node $s_i$ are likely distanced apart by $\hat{d}$ meters, and the angular direction of the sensor node $s_i$ relative to the reference node $r_i$ is $\hat{\omega}$, counterclockwise. In addition, $\pi(\hat{d},\hat{\omega})=0$ means that there is no relation between these two-paired RSSI patterns.

Therefore, the localization problem now can be formulated by a maximum likelihood function as $$(d_{<r,s>}, \omega_{<r,s>}) = \arg\max_{\hat{d},\hat{\omega}} \tau(\hat{d}, \hat{\omega}) \quad \text{equation (20)}$$

where $d_{<r,s>}$ is the predicted distance between the reference node $r_i$ and the sensor node $s_i$, and $\omega_{<r,s>}$ is the predicted angular direction of the sensor node $s_i$ relative to the reference node $r_i$, counterclockwise. Thus, if the coordinate of the reference node $r_i$ is $(x_r, y_r)$, the coordinate of the sensor node $s_i$ can be predicted by $(x_s, y_s)=(x_r+d_{<r,s>}\cos(\omega_{<r,s>}), y_r+d_{<r,s>}\sin(\omega_{<r,s>}))$.

Figure 5:
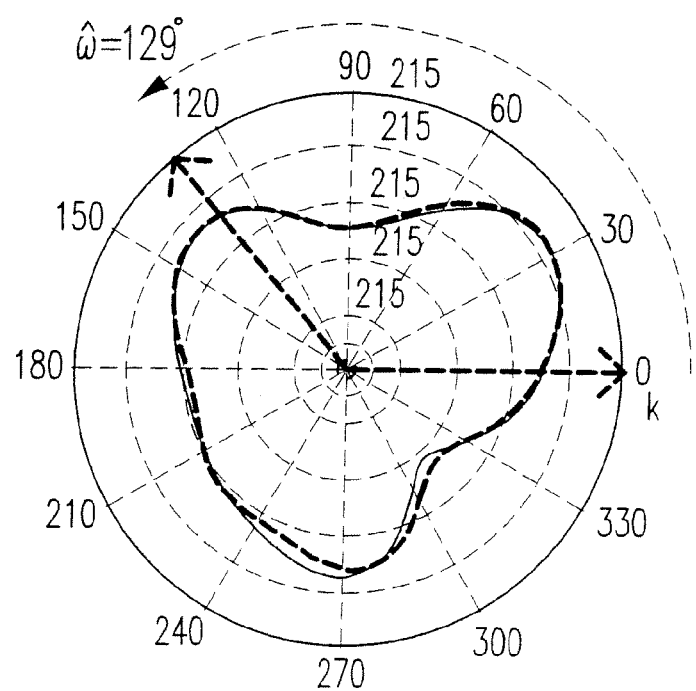
FIG. 5 illustrates an result of matching $\Omega_{<r,s>}(\delta)$ and $\Psi_r(d, \omega)$.

A result of the embodiment is shown in FIG. 5, by matching $\Omega_{<r,s>}(\delta)$, solid line, against $\Psi_r(d, \omega)$, bold dash line, a large value of $\tau(\hat{d},\hat{\omega})=0.97$ could be obtained if $\hat{d}=1.8$ and $\hat{\omega}=129°$. It means that the distance between the sensor node $s_i$ and the reference node $r_i$ is 1.8 meters, and the azimuth of the sensor node $s_i$ relative to the reference node $r_i$ is 129°, counterclockwise.

The robust correlation estimator proposed in the invention can be used to analyze the similarity or dissimilarity of RSSI patterns in multidimensional space. It allows the network to locate the position of the sensor node $s_i$ by the reference node $r_i$.

The follows is the second embodiment of the present invention, please referring to the previous embodiment for the configuration of the WSN. According to another configuration of the present invention, the localizing framework by a single reference node in the first embodiment is directly converted into the localizing framework of considering multiple reference nodes, namely collaborative localization. Based on Eq. (20), when the sensor node $s_i$ is covered by multiple reference nodes, the geometric positions estimated by multiple reference nodes $r_i$ could be used to improve the accuracy of the localization.

The sensor node $s_i$ is covered in the communication ranges of n reference nodes $r_1, r_2, \ldots,$ and $r_n$. The reference nodes $r_1, r_2, \ldots,$ and $r_n$ separately broadcast a series of beacons toward the sensor node $s_i$. By matching the RSSI patterns with the reference standard patterns of the reference node using the method presented in the previous embodiment, the robust correlation coefficients could be obtained by $$\forall i = 1, \ldots, n, \Psi_{r_i}(d, \omega) \xleftrightarrow{\text{Matching}} \Omega_{<r_i,s>}(\delta) \rightarrow \tau_{<r_i,s>}(\hat{d}_i, \hat{\omega}_i) \quad \text{equation (21)}$$

wherein $\hat{d}_i$ and $\hat{\omega}_i$ are potential distance and angular direction of the sensor node $s_i$ relative to the reference nodes $r_1, r_2, \ldots,$ and $r_n$, respectively. All robust correlations are merged together into one overall solution space in accordance with the coordinates of the reference nodes $r_1, r_2, \ldots,$ and $r_n$. All robust correlations $\tau_{\langle r_i, s \rangle}(\hat{d}_i, \hat{\omega}_i)$, $i=1, 2, \ldots, n$, could be converted into a two-dimensional Cartesian coordinate system by $\forall \hat{d}_i$ and $\hat{\omega}_i$, $$\gamma_{\langle r_i, s \rangle}(x_{r_i} + \hat{d}_i \cos \hat{\omega}_i, y_{r_i} + \hat{d}_i \sin \hat{\omega}_i) = \tau_{\langle r_i, s \rangle}(\hat{d}_i, \hat{\omega}_i) \quad \text{equation (22)}$$

the values in an overall solution space $\Im(x, y)$ are initialize to one. The merging process of all robust correlations could be formulated by $\forall (x, y)$ in $\gamma_{\langle r_i, s \rangle}(x, y)$, where $i=1, 2, \ldots, n$ $$\begin{cases} \Im(x_{r_i} + x, y_{r_i} + y) = \\ \Im(x_{r_i} + x, y_{r_i} + y) \times \Upsilon_{\langle r_i, s \rangle}(x, y), & \text{if } \sqrt{x^2 + y^2} \leq \Re; \\ \Im(x_{r_i} + x, y_{r_i} + y) = 0, & \text{otherwise.} \end{cases} \quad \text{equation (23)}$$

where $(x_{r_i}, y_{r_i})$ is the coordinate of the reference node $r_i$, and $\Re$ is the reliable localization capability of the reference nodes $r_i$. The range of $\Re$ could be determined by the range of d in the reference standard patterns $\Psi_r(d, \omega)$ of the reference node $r_i$.

After the overall solution space is obtained, the highest possible position of the sensor node $s_i$ is determined by using the squared-centroid of a set of projected points in $\Im(x, y)$ as $$\forall (x, y) \text{ in } \Im(x, y), \hat{x}_s = \frac{\sum_x \left(\max_y \Im(x, y)\right)^2 \cdot x}{\sum_x \left(\max_y \Im(x, y)\right)^2}, \quad \text{equation (24)}$$

$$\hat{y}_s = \frac{\sum_y \left(\max_x \Im(x, y)\right)^2 \cdot y}{\sum_y \left(\max_x \Im(x, y)\right)^2}$$

wherein $(\hat{x}_s, \hat{y}_s)$ is the estimated coordinate of the sensor node $s_i$. Since the squared-centroid method has a linear computational complexity (x+y), thereby it is more preferred than traditional centroid method that has an order of (x×y) time complexity. With more reference nodes involved in the localization process, the accuracy of coordinate estimation presented above could be further enhanced.

Figure 6:
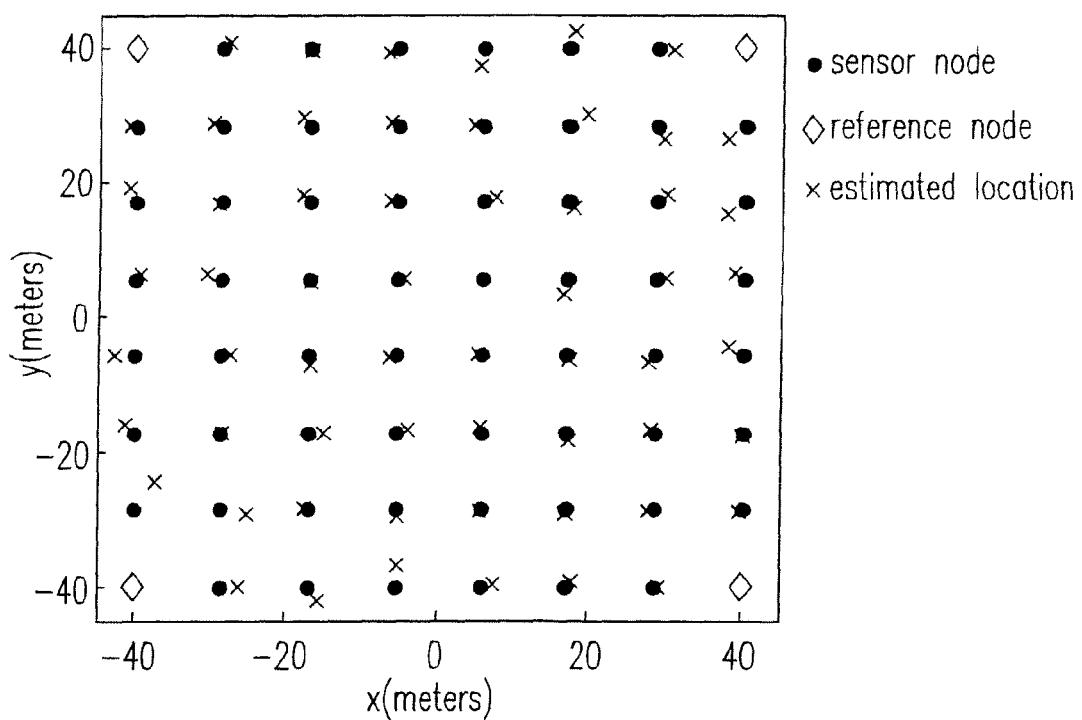
FIG. 6 illustrates a diagram of the configuration of the nodes and the localization result in a Cartesian coordinates.

A exemplary diagram for the configuration of each node of the embodiment in the Cartesian Coordinate in FIG. 6, wherein the dots • represents for the coordinate of the sensor node $s_i$, the diamonds ◇ represents for the coordinate of the reference node $r_i$ the sensor nodes $s_i$ and the reference node $r_i$ are preferred to be arranged in grid, and the crosses ╳ represents for the estimated coordinate of the sensor node $s_i$. The reference standard patterns in FIG. 6 are generated by Eq. (12), and the RSSI patterns are measured for each of the sensor nodes $s_i$ after the antennas of the reference nodes $r_i$ are rotated for a complete cycle. The result of the localization in FIG. 6 is that the averaged bias is 1.5 m, the standard deviation of the bias is 0.96 m, and the estimation error of the sensor nodes $s_i$ located near the center of the sensing is 0.14 m.

The configuration parameters of FIG. 6 are shown in Table I.

| Simulation Parameters | Parameter Value |
| --- | --- |
| Size of sensor field | 80 m × 80 m |
| Number of grids | 8 |

-continued

| Simulation Parameters | Parameter Value |
| --- | --- |
| Number of reference nodes | 4 |
| Distance-power gradient α | 0.0003 |
| Noise strength in RSSI pattern $\Omega_{\langle r, s \rangle}(\delta)$ | N (0, 6) |
| Power of beacon $P_r$ | 0 dBm |
| Reliable localization capability $\Re$ | 1 m ~ 100 m |
| RSS detection threshold | −80 dBm |
| Neighborhood selection threshold | −75 dBm |

Figure 7:
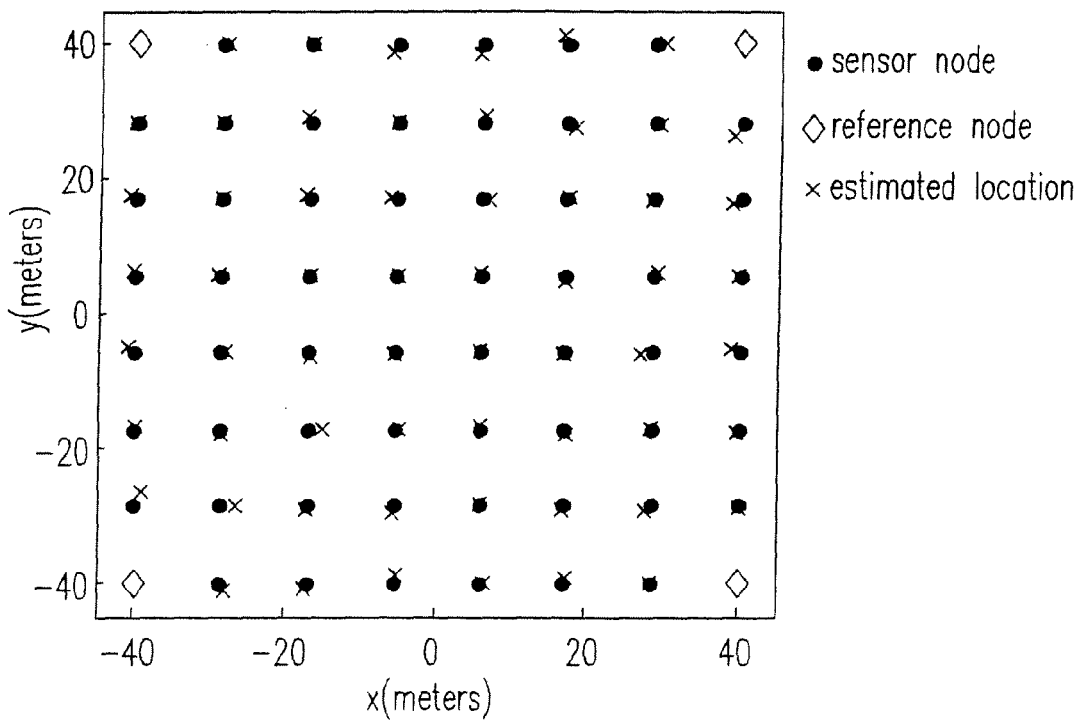
FIG. 7 illustrates another diagram of the configuration of the nodes and the localization result in a Cartesian coordinates.

Another exemplary diagram of the configuration of each of the nodes and the localization result thereof of the embodiment in the Cartesian Coordinate is shown in FIG. 7, wherein the symbols are the same as in FIG. 6. The difference is that the antennas of the reference nodes $r_i$ are rotated one more cycle to measure the RSSI patterns for each of the sensor nodes, so that the signal-to-noise ratios of the measured RSSI patterns could be increased. It could be seen that the localization result is more accurate from the estimated coordinate represented by the crosses ╳ in FIG. 7. The averaged bias is 0.79 m, the standard deviation of the bias is 0.56 m, the maximal bias is 2.47 m, and minimal bias is 0.07 m.

Although a grid arrangement is employed in the embodiment, it could be understood that the present invention is not limited to being implemented under the grid arrangement. Please refer to the following embodiment.

Figure 8A:
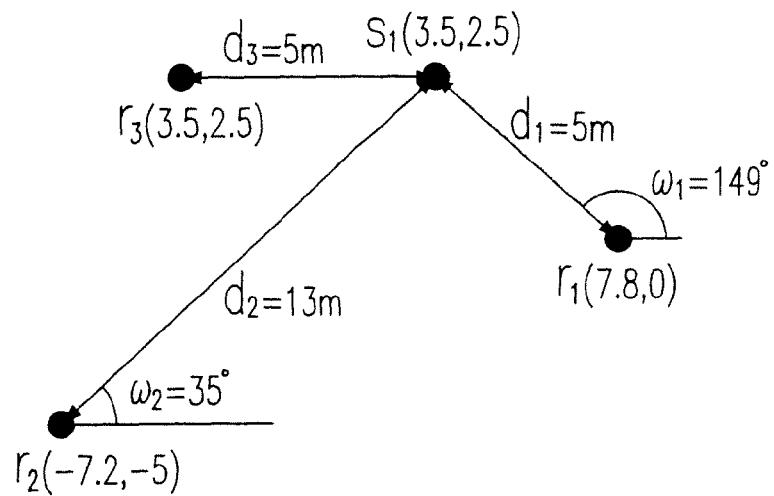
FIG. 8 (A) illustrates a diagram of the localization by three reference nodes.
Figure 8B:
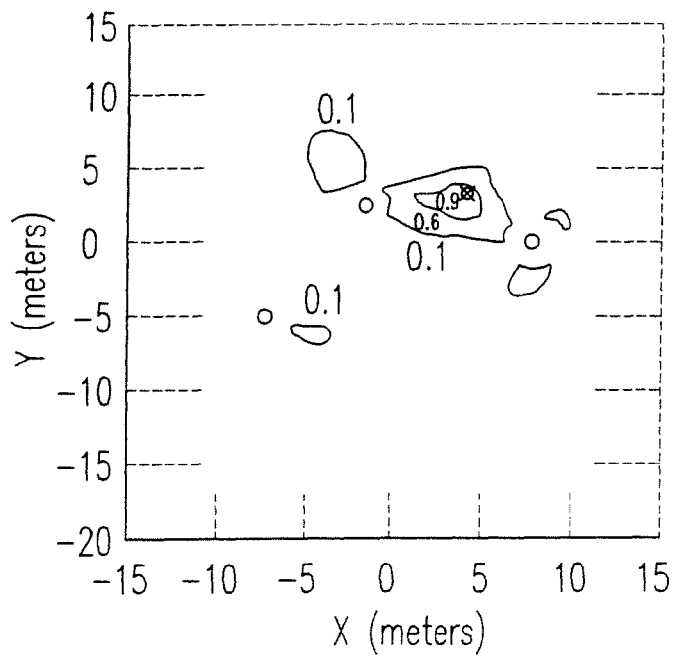

Yet another third embodiment, the configuration of the WSN is similar to that of those foregoing embodiment, and thus an unnecessary details are not described to avoid making the specification long-winded. In the embodiment, there are three reference nodes used for localizing the sensor node $s_i$, the coordinate thereof are $r_1(7.8, 0) \cdot r_2(-7.2, -5)$ and $r_3(-1.5, 2.5)$ respectively, as in FIG. 8(A). The robust correlation $\tau(\hat{d}, \hat{\omega})$ estimated by the reference nodes $r_1$, $r_2$ and $r_3$ are merged into an overall solution space $\Im(x, y)$. In FIG. 8(B), the overall solution space $\Im(x, y)$ is represented by a contour map, and the values of $\Im(x, y)$ are represented by the number on the contour. The cross symbol ╳ is the centroid of the overall solution space $\Im(x, y)$, and the coordinate (3.3, 2.5) thereof is the potential location of the sensor node $s_1$. It could be understood that the more reference nodes in the WSN, the more accurate localization result would be obtained.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A positioning method for a sensor node, comprising steps of:
   providing a first transmitting antenna having a first omni-directional radiation pattern on a first plane;
   rotating the first transmitting antenna about an axis substantially parallel to the first plane and passing through the first transmitting antenna;
   transmitting a wireless signal while the first transmitting antenna rotates about the axis for every a predetermined central angle;
   receiving the wireless signal at the sensor node;
   obtaining values of Received Signal Strength Indication (RSSI) of the respective wireless signals;

constructing a first RSSI pattern by the values of the RSSI; and determining a location of the sensor node by the first RSSI pattern.

2. The method as claimed in claim 1, wherein the first RSSI pattern is constructed by a predetermined number of the values of RSSI.

3. The method as claimed in claim 2, wherein the first transmitting antenna is configured on a first reference node, and the method further comprises steps of:

providing a second reference node; and obtaining a second RSSI pattern to collaboratively determine the location of the sensor node with the first RSSI pattern.

4. The method as claimed in claim 2, wherein the step of determining the location of the sensor node further comprises a step of using the RSSI pattern as a feature value to determine the location via a pattern recognition method.

5. The method as claimed in claim 2, wherein the predetermined number is a value of an integer part of a quotient of $2\pi$ divided by a degree of the predetermined central angle.

6. The method as claimed in claim 1, wherein the sensor node has a second receiving antenna having a second omnidirectional radiation pattern on a second plane perpendicular to the axis.

7. The method as claimed in claim 6, wherein the first transmitting and the second receiving antennas are dipole omni-directional antennas, and the first plane is perpendicular to a horizontal plane.

8. The method as claimed in claim 1, wherein the wireless signal is a beacon and is a linear polarization electromagnetic wave.

9. A positioning system, comprising:

a sensor node having a radiation pattern on a first plane; and a reference node comprising a first dipole omnidirectional transmitting antenna oriented parallel to the first plane, wherein the first dipole omnidirectional transmitting antenna is configured to transmit a wireless signal while the first dipole omnidirectional transmitting antenna rotates about an axis perpendicular to the first plane for every a predetermined central angle, the sensor node is configured to receive the wireless signal and combines respective values of the Received Signal Strength Indication (RSSI) of the received wireless signals to obtain an RSSI pattern, and a location of the sensor node is determined by the RSSI pattern.

10. The system as claimed in claim 9 further comprising a servomotor, wherein the servomotor is configured on the first dipole omnidirectional transmitting antenna and rotating the first dipole omnidirectional transmitting antenna about the axis perpendicular to the first plane.

11. The system as claimed in claim 9 further comprising a second reference node to obtain a second RSSI pattern to collaboratively determine the location of the sensor node with the first RSSI pattern.

12. The system as claimed in claim 9, wherein the sensor node has a second dipole omnidirectional receiving antenna having the radiation pattern.

13. A method for localizing a sensor node, comprising steps of:

providing a directive radiation pattern on a first plane;

rotating the directive radiation pattern;

transmitting a wireless signal every time when the directive radiation pattern is rotated for a predetermined central angle;

constructing a first Received Signal Strength (RSSI) pattern according to respective RSSI values of the wireless signals received by the sensor node; and determining the location of the sensor node by the first RSSI pattern.

14. The method as claimed in claim 13, wherein the first RSSI pattern is constructed by a predetermined number of values of the RSSI.

15. The method as claimed in claim 14 further comprising a step of providing a second reference node to obtain a second RSSI pattern.

16. The method as claimed in claim 14, wherein the step of determining the location of the sensor node further comprises a step of using the first RSSI pattern as a feature value to determine the location by a pattern recognition method.

17. The method as claimed in claim 14, wherein the predetermined number is a value of an integer part of a quotient of $2\pi$ divided by a degree of the predetermined central angle.

18. The method as claimed in claim 13, wherein the step of rotating the directive radiation pattern further comprises a step of providing a first transmitting antenna having the directive radiation pattern on the first plane to determine the location of the sensor node.

19. The method as claimed in claim 13, wherein the step of determining the location of the sensor node further comprises a step of providing a second receiving antenna having the omnidirectional radiation pattern on the first plane for receiving the signal.

* * * * *